US010502599B2

(12) United States Patent
Rogers et al.

(10) Patent No.: US 10,502,599 B2
(45) Date of Patent: Dec. 10, 2019

(54) POLYMERIC MAGNETIC FLOWMETER FLOW BODY ASSEMBLY

(71) Applicant: Rosemount Inc., Chanhassen, MN (US)

(72) Inventors: Steven B. Rogers, Minnetonka, MN (US); Michael J. Mayer, Waconia, MN (US); Bruce D. Rovner, Minneapolis, MN (US); Michael J. Mikolichek, Farmington, MN (US); Erik D. Anderson, Chanhassen, MN (US); Nicholas W. Bond, Belle Plaine, MN (US); Chad T. Weigelt, Minneapolis, MN (US)

(73) Assignee: Rosemount Inc., Shakopee, MN (US)

( * ) Notice: Subject to any disclaimer, the term of this patent is extended or adjusted under 35 U.S.C. 154(b) by 0 days.

(21) Appl. No.: 15/086,826

(22) Filed: Mar. 31, 2016

(65) Prior Publication Data

US 2017/0284845 A1    Oct. 5, 2017

(51) Int. Cl.
*G01F 1/58* (2006.01)

(52) U.S. Cl.
CPC .................................. *G01F 1/588* (2013.01)

(58) Field of Classification Search
None
See application file for complete search history.

(56) References Cited

U.S. PATENT DOCUMENTS

| 4,098,118 A | 7/1978 | Schmoock | |
| 4,269,071 A * | 5/1981 | Wada | G01F 1/584 73/861.12 |
| 4,773,275 A * | 9/1988 | Kalinoski | G01F 1/584 73/861.12 |

(Continued)

FOREIGN PATENT DOCUMENTS

| JP | 53-100252 | 2/1980 |
| JP | 10-019617 A | 1/1998 |

(Continued)

OTHER PUBLICATIONS

International Search Report and Written Opinion for International Patent Application No. PCT/US2017/023291, dated Jun. 26, 2017, 17 pages.*

(Continued)

*Primary Examiner* — Harshad R Patel
(74) *Attorney, Agent, or Firm* — Christopher R. Christenson; Kelly, Holt & Christenson PLLC

(57) ABSTRACT

A polymeric flow tube assembly is provided. The flow tube assembly includes a flow conduit configured to allow fluid flow therethrough. A first coil is mounted with respect to the flow conduit and disposed about a first magnetic pole member. A second coil is mounted with respect to the flow conduit and is disposed about a second magnetic pole member. The second magnetic pole member is configured to cooperate with the first magnetic pole member to generate an electromagnetic field across a flow measurement aperture. First and second electrodes are positioned within the flow tube assembly to measure an electromotive force generated within a fluid in the flow measurement aperture. At least one of the first magnetic pole member, second magnetic pole member, first electrode and second electrode is formed, at least in part, of a polymer.

16 Claims, 13 Drawing Sheets

(56) References Cited

U.S. PATENT DOCUMENTS

| | | | | |
|---|---|---|---|---|
| 4,774,844 A * | 10/1988 | Davis | ...................... | G01F 1/588 |
| | | | | 73/861.12 |
| 5,540,103 A * | 7/1996 | Zingg | ...................... | G01F 1/586 |
| | | | | 73/861.11 |
| 5,817,948 A * | 10/1998 | Davis | ...................... | G01F 1/584 |
| | | | | 73/861.12 |
| 7,650,797 B2 * | 1/2010 | Nielsen | ...................... | G01F 1/58 |
| | | | | 73/861.12 |
| 2001/0002553 A1* | 6/2001 | Willigen | ................. | G01F 1/586 |
| | | | | 73/861.12 |
| 2005/0223816 A1* | 10/2005 | Ishikawa | ................. | G01F 1/586 |
| | | | | 73/861.12 |
| 2006/0010988 A1* | 1/2006 | Bitz | ....................... | G01F 1/584 |
| | | | | 73/861.12 |
| 2006/0174715 A1* | 8/2006 | Wehrs | ...................... | G01F 1/60 |
| | | | | 73/861.12 |
| 2007/0022823 A1* | 2/2007 | Knill | ....................... | G01F 1/584 |
| | | | | 73/861.12 |
| 2007/0036590 A1* | 2/2007 | Terashima | ......... | G03G 15/0808 |
| | | | | 399/277 |
| 2007/0234821 A1 | 10/2007 | Wehrs et al. | | |
| 2010/0024569 A1* | 2/2010 | Ehrenberg | .............. | G01F 1/586 |
| | | | | 73/861.12 |
| 2010/0107776 A1* | 5/2010 | Shanahan | ................. | G01F 1/60 |
| | | | | 73/861.11 |
| 2010/0180692 A1* | 7/2010 | Reichart | .................... | G01F 1/58 |
| | | | | 73/861.11 |
| 2012/0297891 A1* | 11/2012 | Voigt | ...................... | G01F 1/584 |
| | | | | 73/861.11 |
| 2014/0083199 A1* | 3/2014 | Rogers | .................... | G01F 1/584 |
| | | | | 73/861.12 |
| 2014/0083200 A1* | 3/2014 | Rogers | .................... | G01F 1/588 |
| | | | | 73/861.12 |
| 2014/0144246 A1* | 5/2014 | Drahm | .................... | G01F 1/002 |
| | | | | 73/861.12 |
| 2014/0260661 A1* | 9/2014 | Smith | ..................... | G01F 1/584 |
| | | | | 73/861.12 |
| 2015/0168188 A1* | 6/2015 | Reichart | ................ | G01F 1/584 |
| | | | | 73/861.12 |

FOREIGN PATENT DOCUMENTS

| | | |
|---|---|---|
| JP | H1019617 A | 1/1998 |
| JP | 11-148847 A | 6/1999 |
| JP | H11148847 A | 6/1999 |
| JP | 22006249359 A | 9/2006 |

OTHER PUBLICATIONS

First Office Action dated Mar. 1, 2019 for Chinese Patent Application No. 201611001693.1, 14 pages including English translation.
Japanese Office Action dated Sep. 3, 2019 for Japanese Patent Application No. 2018-551265, 18 pages including English Translation.

* cited by examiner

POLYMERIC MAGNETIC FLOWMETER FLOW BODY ASSEMBLY

BACKGROUND

Magnetic flowmeters (or mag meters) measure flow by Faraday induction, an electromagnetic effect. The magnetic flowmeter energizes a coil which generates a magnetic field across a section of a flow body assembly. The magnetic field induces an electromotive force (EMF) across the flow of conductive process fluid. The resulting potential developed across the conductive fluid is measured using a pair of electrodes that extends into the flowing process fluid. Alternatively, some magnetic flowmeters employ capacitive coupling between the electrodes and the process fluid such that the EMF can be measured without direct contact. In any event, the flow velocity is generally proportional to the induced EMF, and the volumetric flow is proportional to the flow velocity and the cross-sectional area of the flow body.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flowmeters are also often employed in the hydrocarbon fuel industry.

Magnetic flowmeters provide fast and accurate flow measurements in applications where other flow techniques, which introduce a flow measurement element (such as an orifice plate) into the process flow, are not suitable. One of the significant costs in the manufacture of the magnetic flowmeter is the flow body through which the process fluid flows. This flow body must bear the process fluid pressure and must not introduce leaks into the process. Typically, the flow body is formed as a tube and includes a pair of flanges that bolt to pipe flanges to create a robust process fluid connection. In order to provide flow body assemblies that are suitable for a variety of different process flow connections, flow bodies are designed and manufactured in order to accommodate different cross-sectional flow areas. However, each cross sectional flow area size, or diameter in the case of a flow tube, offered by the manufacturer typically requires dedicated tooling and manufacturing processes. Thus, additional cost and lead time can be introduced into the manufacturing process due to the availability of such varied flow diameter options.

SUMMARY

A polymeric flow body assembly is provided. The flow body assembly includes a flow conduit configured to allow fluid flow therethrough. A first coil is mounted with respect to the flow conduit and disposed about a first magnetic pole member. A second coil is mounted with respect to the flow conduit and is disposed about a second magnetic pole member. The second magnetic pole member is configured to cooperate with the first magnetic pole member to generate an electromagnetic field across a flow measurement aperture. First and second electrodes are positioned within the flow body assembly to measure an electromotive force generated within a fluid in the flow measurement aperture. At least one of the first magnetic pole member, second magnetic pole member, first electrode and second electrode is formed, at least in part, of a polymer.

DETAILED DESCRIPTION OF ILLUSTRATIVE EMBODIMENTS

Figure 1:
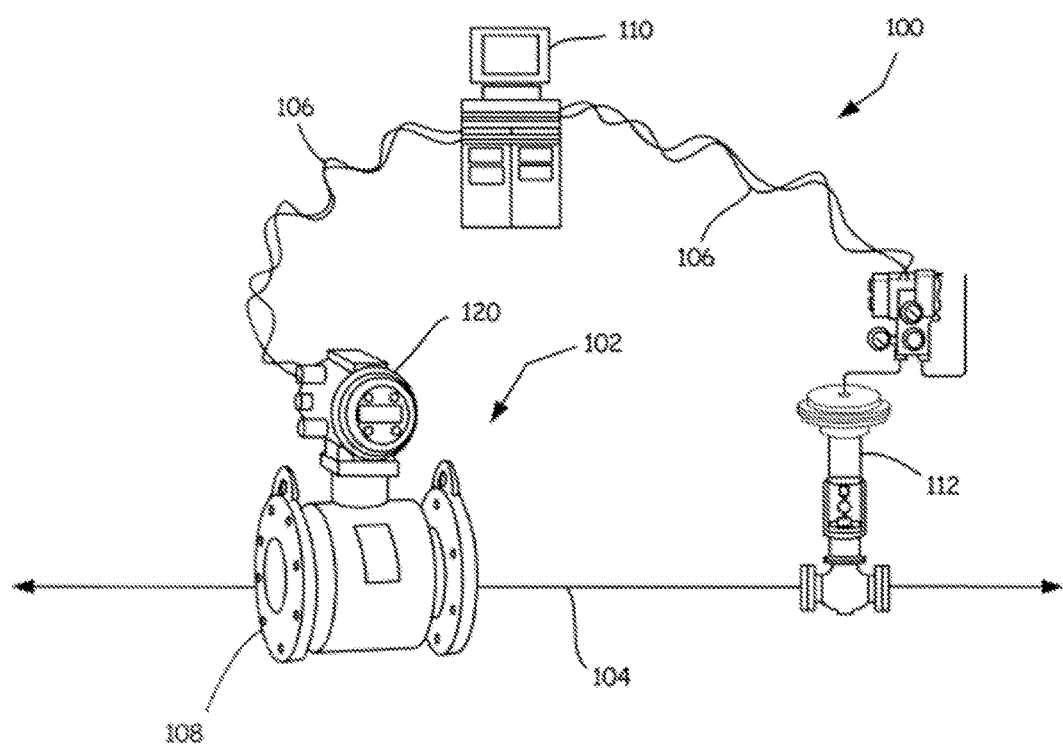
FIG. 1 is a diagrammatic view of a typical environment with which embodiments of the present invention are useful.

FIG. 1 illustrates a typical environment 100 for magnetic flowmeter 102. Magnetic flowmeter 102 is coupled to process piping, illustrated diagrammatically at line 104 that also couples to control valve 112. Magnetic flowmeter 102 is configured to provide a flow rate output relative to the process fluid flow in a process plant. Examples of such process fluids include slurries and liquids in chemicals, pulp, pharmaceutical, food and other fluid processing plants.

Magnetic flowmeter 102 includes electronics housing 120 or a suitable junction box connected to a flow body. In the embodiment shown in FIG. 1, the flow body is disposed between a pair of mounting flanges 108 for mounting to associated pipe flanges. However, embodiments of the present invention are equally applicable to wafer-type flow bodies as well. Magnetic flowmeter 102 outputs are configured for transmission over long distances to a controller or indicator via a process communication bus 106. In typical processing plants, communication bus 106 can be a 4-20 mA current loop, a FOUNDATION™ Fieldbus connection, a pulse output/frequency output, a Highway Addressable Remote Transduce (HART®) protocol communication, a wireless communication connection, such as that in accordance with IEC62591, Ethernet, or a fiber optic connection to a controller such as system controller/monitor 110 or other suitable device. System controller 110 is programmed as a process monitor, to display flow information for a human operator or as a process controller to control the process using control valve 112 over process communication bus 106. While embodiments of the present invention are applicable to all magnetic flowmeters, they are particularly relevant to magnetic flowmeters that coupled to relatively small diameter process pipes. This is because in the smallest flowmeter flow body sizes, there is much less overlap in the measurable flow range of one size and the next size. For example, 1.5 inch diameter through 14 inch diameter flowmeters have flow ranges that overlap by 44% to 82%. However, the smallest fractional sizes 0.15 inch diameter through 0.5 inch diameter can measure flow ranges that overlap by less than 25%. This makes it more difficult for end users to choose a size that can measure a wide flow turndown. However, as set forth above, adding individual size options is costly in terms of development time, inventory of unique parts, and manufacturing complexity.

Figure 2:
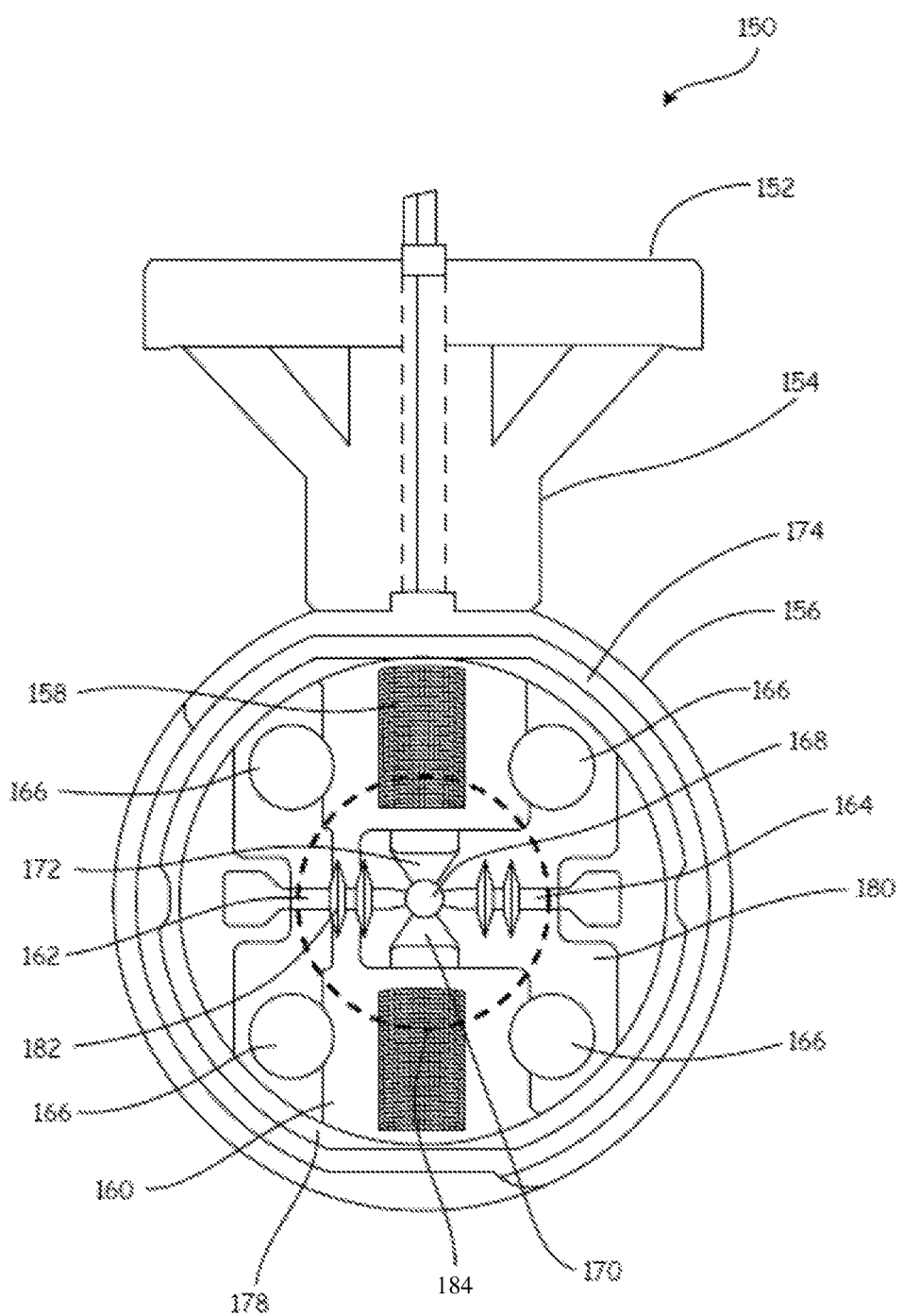
FIG. 2 is a diagrammatic view of a polymeric flow body assembly in accordance with an embodiment of the present invention.

FIG. 2 is a diagrammatic view of a polymeric flow body assembly in accordance with an embodiment of the present invention. Polymeric flow body assembly 150 is a unitary piece that can be easily machined to a vast array of sizes. Assembly 150 can use the same coil and pole member for a variety of different flow configurations, and is able to provide a single flow body that, based upon machining, is capable of measuring flows with a measurement bore diameter from 0.030 inches to over 0.5 inch diameter. Assembly 150 includes flange 152 that is configured to mount a junction box or electronics housing, such as electronics housing 120, described above. A number of conductors run through flange 152 and through neck 154 into flow body 156. The conductors couple to a plurality of coils 158, 160 and a pair of electrodes 162, 164. In the embodiment illustrated in FIG. 2, four mounting holes 166 are provided that allow mounting bolts to pass through flow body 156. In the embodiment shown, a centrally-located measurement aperture 168 is provided that has a pair of diametrically opposed magnetic pole members 170, 172 arranged approximately 90° offset from electrodes 162, 164. In the example shown in FIG. 2, aperture 168 has a diameter of approximately 0.080 inches. Pole members 170, 172 are, in one embodiment, formed of a polymer, such as plastic, that is filled with magnetic material such as iron powder. Additionally, magnetic return path 174 is also, in one embodiment, formed of a polymer filled with magnetic material such as iron powder. In one embodiment, electrodes 162, 164 are also formed of a polymer, such as plastic, that is filled with a conductive material such as carbon and/or nickel. Additionally, the polymer used for pole members 170, 172 and electrodes 162, 164 can be the same, in some embodiments. A polymeric frame 178 is also provided within flow body 156 in order to maintain or otherwise mount all of the various components of flow body 156 into a single, solid piece so that the final body can be more easily molded. In one embodiment, polymeric frame 178 is also formed of the same polymer as pole members 170, 172 and electrodes 162, 164. However, frame 178 will not have any conductive or magnetic fillers. Similarly, a polymeric filler 180 is also provided that is, in one embodiment, formed of the same polymer as frame 178 and pole members 170, 172 and electrodes 162, 164. Additionally, in the embodiment shown in FIG. 2, each of electrodes 162, 164 includes one or more sealing fins 182 that extend radially from each electrode 162, 164. In one embodiment, these sealing fins are formed of the same material as the electrode and are designed such that heat from the over mold layer will be sufficient to melt the thin ends of the fins 182 to create a consistent seal between the components.

Figure 3A:
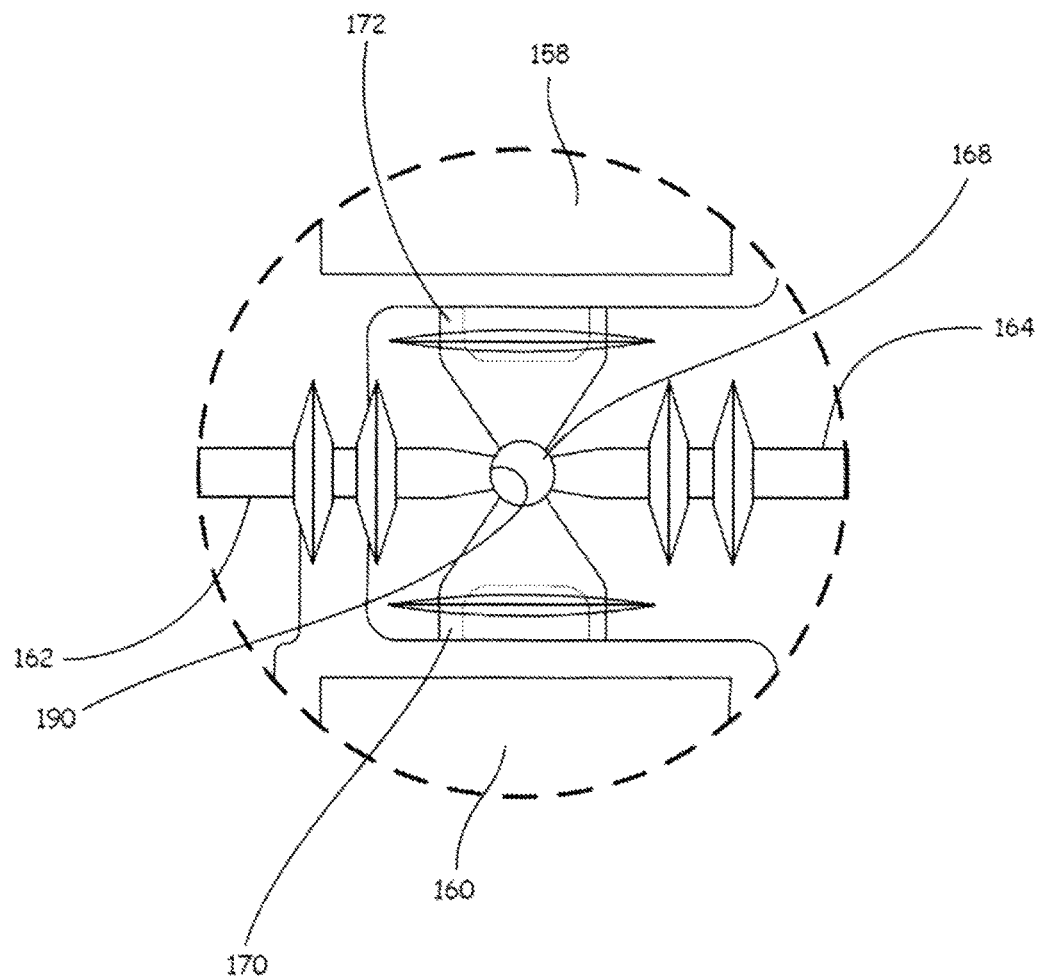
FIGS. 3A and 3B are enlarged diagrammatic views of a region shown in FIG. 2.
Figure 3B:
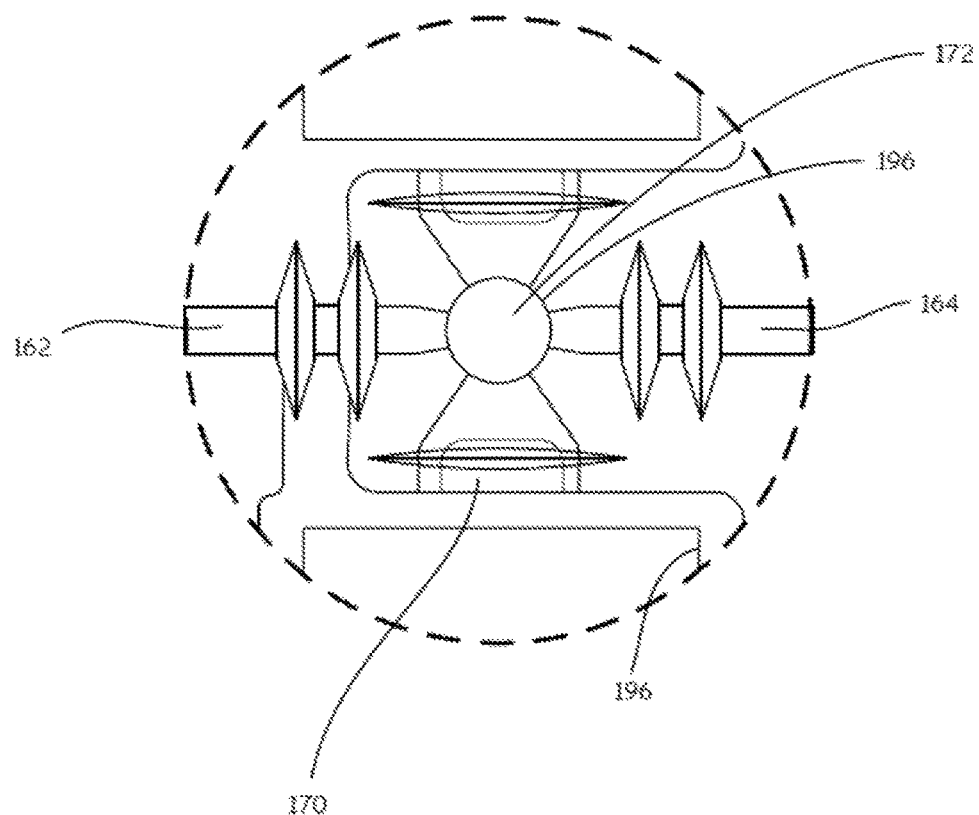

FIGS. 3A and 3B are enlarged diagrammatic views of region 184 in FIG. 2. As shown in FIG. 3A, pole member 170 is disposed such that electrical windings in coil 160 encircle pole member 170. Thus, as electrical current flows through the windings of coil 160, a magnetic field is generated by pole member 170. Similarly, as electrical current flows through windings of coil 158, a magnetic field is generated by pole member 172. This magnetic field is directed across measurement bore 168 and thus generates an EMF that is detectable using electrodes 162, 164. Measurement bore 168 is generally formed by a single machining operation, such as drilling. This drilling operation removes a portion of each of pole members 170, 172, and electrodes 162, 164. Accordingly, the portion of pole members 170, 172 and electrodes 162, 164 that interact with measurement bore 168 generally have an end, such as end 190 of electrode 162 that conforms to the inside diameter of bore 168. Since the components are polymeric, they are easily machinable. Thus, different measurement bores can be generated simply by using different sized drill bits in the drilling operation. For example, FIG. 3B shows a larger measurement bore 196. Further, the larger bore is easily accommodated by electrodes 162, 164 and pole members 170, 172, which simply have additional material removed. The ends of pole members 170, 172 and electrodes 162, 164 still conform to the inside diameter of measurement bore 196.

Figure 4:
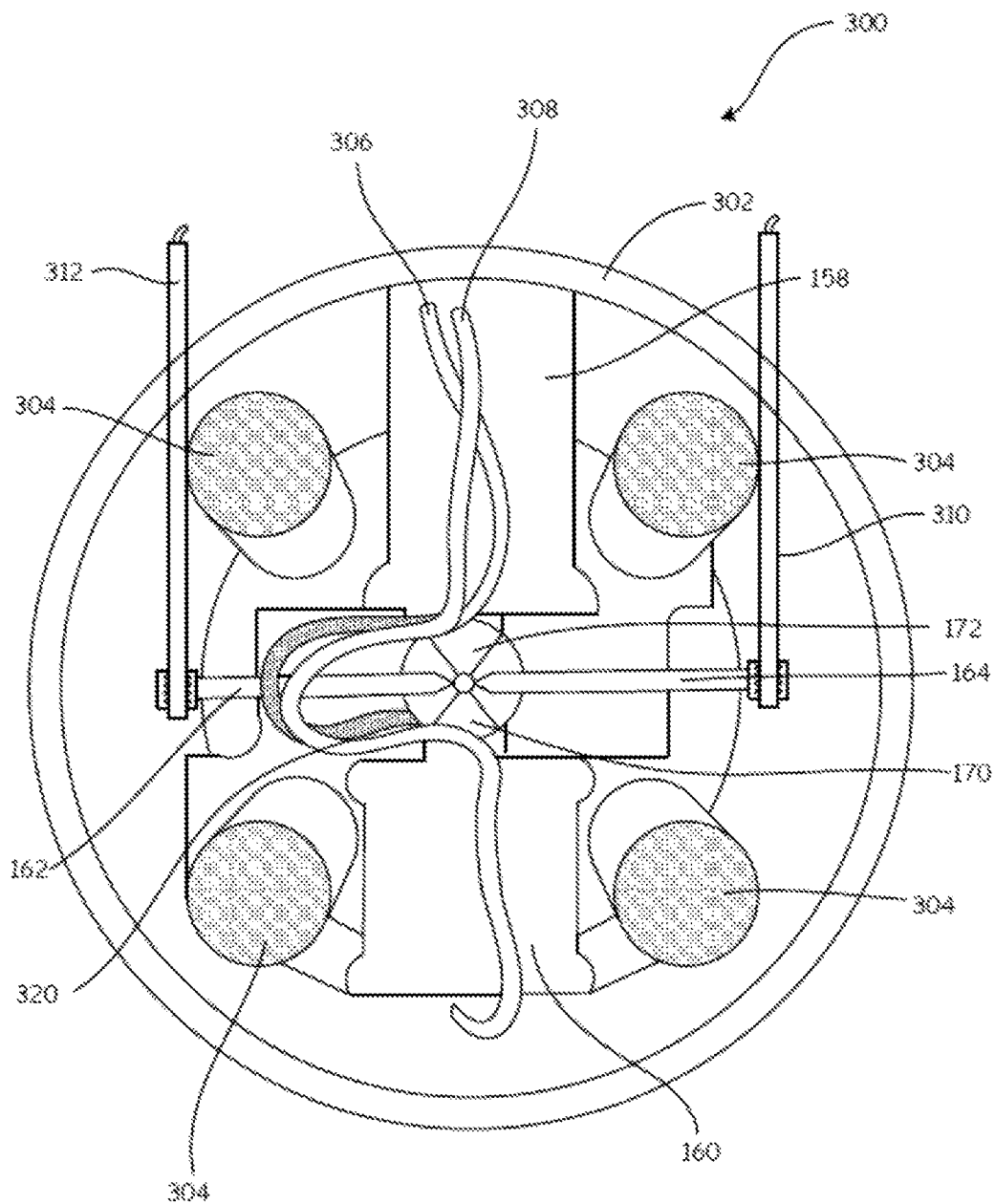
FIG. 4 is a diagrammatic view of an assembled mold for a polymeric flow body assembly prior to introduction of the polymer.

FIG. 4 is a diagrammatic view of an assembled mold for a polymeric flow body assembly prior to introduction of the polymer. Mold 300 includes an outer shell 302, which generally confines and determines the outside diameter of the polymeric flow body assembly. In the example illustrated in FIG. 4, four cylindrical members 304 are provided which will prevent the polymer from occupying the position of cylinders 304 thereby forming mounting holes 166 (shown in FIG. 2). Additionally, the pair of coils 158, 160 are positioned such that respective magnetic pole members 172, 170 are disposed therein. A pair of conductors 306, 308 are electrically coupled to coils 158, 160. Similarly, conductors 310, 312 are operably coupled to respective electrodes 164, 162. Each of magnetic pole members 170, 172 as well as electrodes 162, 164 generally taper toward center 320. The amount of taper for the electrodes as well as the magnetic pole members can be varied based upon different applications. The taper may be linear or nonlinear, as desired. Regardless, for larger measurement bores, there is a larger surface area that interacts with the measurement bore from each of the magnetic pole members as well as the electrodes, in one embodiment.

Figure 5A:
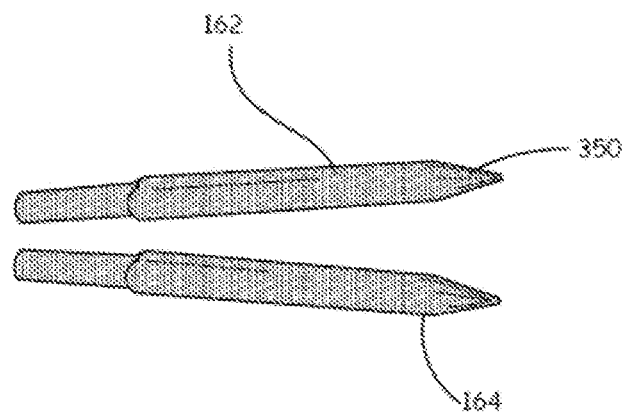
FIG. 5A is a diagrammatic view of magnetic pole members in accordance with an embodiment of the present invention.

FIG. 5A is a diagrammatic view of a pair of electrodes 162, 164 formed of a polymer, such as ABS plastic. As shown more clearly in FIG. 5A, tapered portion 350 is provided at one end of electrode 162. In accordance with one embodiment of the present invention, the ABS (acrylonitrile butadiene styrene) is filled or otherwise embedded with a conductive material, such as carbon and/or nickel. However, it is preferred that the conductive material of electrodes 162, 164 not be a magnetic material.

Figure 5B:
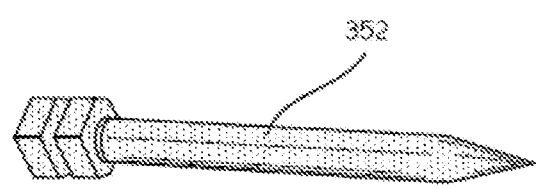
FIG. 5B is a diagrammatic view of electrodes of a flowmeter flow body assembly in accordance with an embodiment of the present invention.

In accordance with an alternate embodiment, electrodes, such as the electrodes shown in FIG. 5B can be formed of a metal, such as stainless steel. While the machining of the stainless steel is more complex than that of ABS electrodes shown in FIG. 5A, stainless steel electrode 352 is extremely robust.

Figure 6:
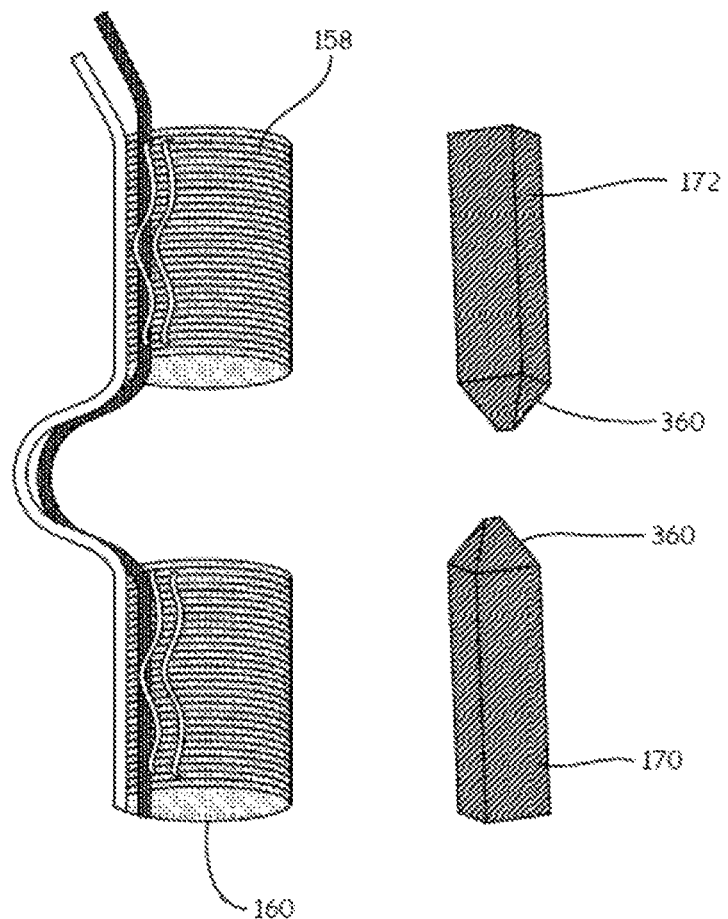
FIG. 6 is a diagrammatic view of coils and magnetic pole members in accordance with an embodiment of the present invention.

FIG. 6 is a diagrammatic view of coils 158, 160 and magnetic pole members 170, 172. As shown in FIG. 6, pole members 170, 172 generally have tapered portions 360 that face each other. In one embodiment, pole members 170, 172 are formed of a polymer, such as ABS plastic, that is filled, or otherwise embedded with iron. Accordingly, magnetic pole members 170, 172 are magnetically compliant.

In accordance with embodiments of the present invention, the electrodes, coils, and pole members are arranged within a mold, such as mold 300 as shown in FIG. 4, and then subjected to the introduction of a polymer, such as ABS plastic. However, it is expressly contemplated that any suitable polymers can be used. Once the polymer has cured, or otherwise set, it can be removed from mold 300.

Figure 7:
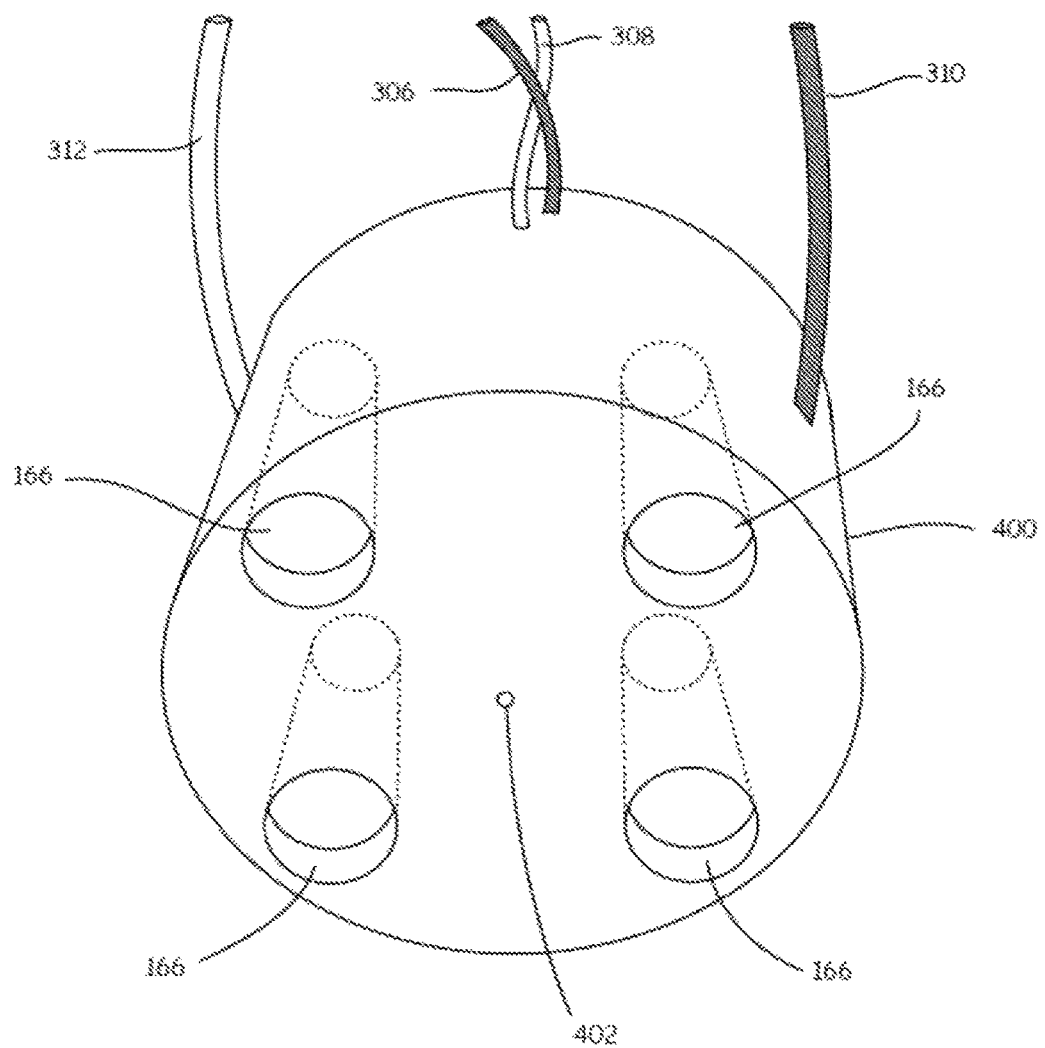
FIG. 7 is a diagrammatic view of flow body assembly in accordance with an embodiment of the present invention.

FIG. 7 is a diagrammatic view of such a removed flow body assembly. As shown, a unitary polymeric block 400 includes four mounting holes 166 as well as wires 306, 308, 310, and 312 extending therefrom. In the center 402 of polymeric structure 400, a measurement aperture will be generated having a diameter that is selected for the ultimate flow application. In accordance with an embodiment of the present invention, this measurement bore is formed simply by selecting the appropriately sized drill bit and drilling axially along center 402.

Figure 8:
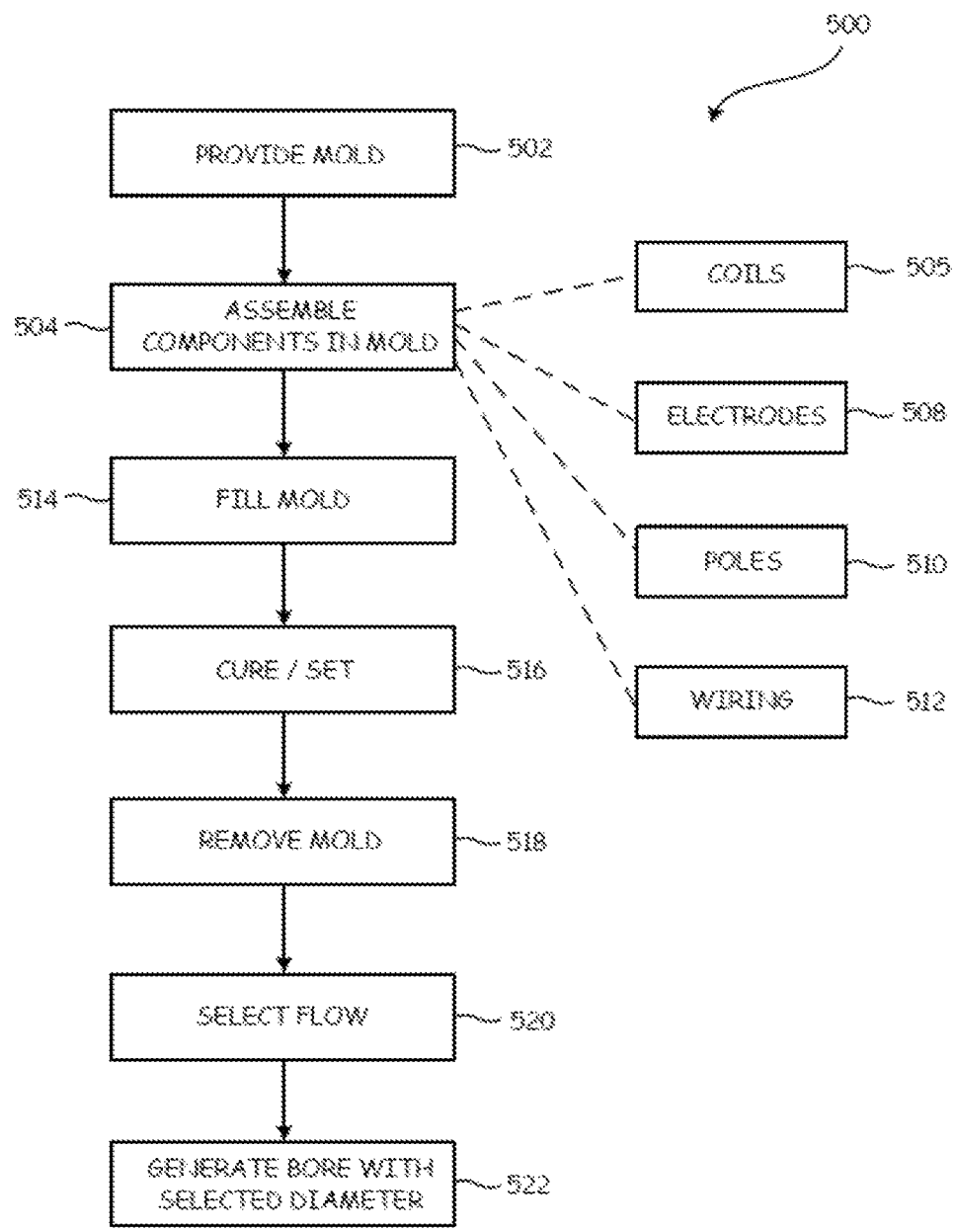
FIG. 8 is a flow diagram of a method of forming a flow body assembly in accordance with an embodiment of the present invention.

FIG. 8 is a flow diagram of a method 500 of forming a flow body assembly in accordance with an embodiment of the present invention. Method 500 begins at block 502 where a mold, such as mold 302 (shown in FIG. 4) is provided. Next, at block 504, components of the flow body are assembled within the mold. Such components and assembly include coils 506, electrodes 508, pole members 510, and wiring 512. Once the assembly of block 504 is complete, the mold is filled with a polymer, as indicated at block 514. Once the polymer has filled the mold, it is allowed to cure or otherwise set, as indicated at block 516. Depending on the type of polymer, this cure/set process can include the introduction of heat, and/or pressure, as appropriate. Next, at block 518, the mold is removed, and a unitary polymeric flow body block is provided. Next, at block 520, a diameter for a measurement bore of the flow body is selected. Finally, at block 522, an aperture or bore is generated in the polymeric flow body block according to the selected diameter. In one embodiment, blocks 520 and 522 comprise simply selecting and obtaining a suitably-sized drill bit and drilling axially through the center of the flow body block. However, in another embodiment, the machining of the bore can be a more complex process allowing variation of the bore cross-sectional shape and/or size in order to improve fluid dynamics in the measurement area. Further, the cross-sectional shape and/or size can vary as the machining operation moves axially through the center of the flow body. Thus, variations can be provided both radially and axially, as desired.

Various flow bodies formed in accordance with embodiments of the present invention have been found to have suitable gains that vary from around 70 with the smallest bore to around 180 with the largest bore. This compares favorably with the 75-140 range available in flow bodies currently. Additionally, polymeric flow bodies formed in accordance with embodiments of the present invention have had favorable repeatability and linearity characteristics. Further still, it is believed that material costs for the polymeric flow body will be reduced in comparison to traditional, metallic, flow body designs.

FIGS. 9A-9D illustrate a plurality of diagrammatic views of a polymeric flow body assembly during various stages of installation in accordance with one embodiment of the present invention. In one embodiment, flow body assembly 1150 can be pre-machined with a pilot bore 1168 and installed within an assembly 1100 prior to machining of the final bore diameter. In one embodiment, this may allow for a reduction in cost and lead time as it allows for flow body assemblies to be pre-manufactured and shipped with an initial pilot bore diameter 1168, and then machined to the final desired bore diameter 1172 by the customer either by request to the manufacturer, or by the customer upon delivery.

Figure 9C:
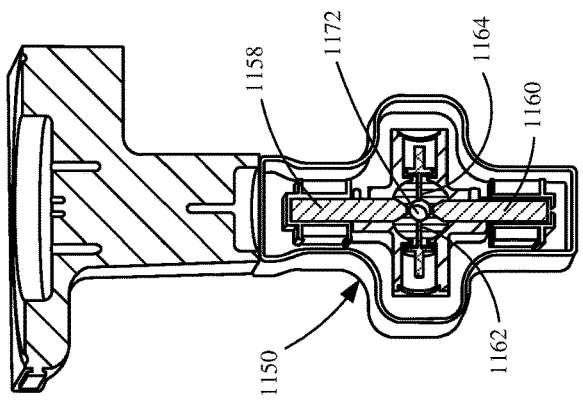
FIGS. 9A-9D illustrate a plurality of diagrammatic views of a polymeric flow body assembly during various stages of installation in accordance with one embodiment of the present invention.
Figure 9B:
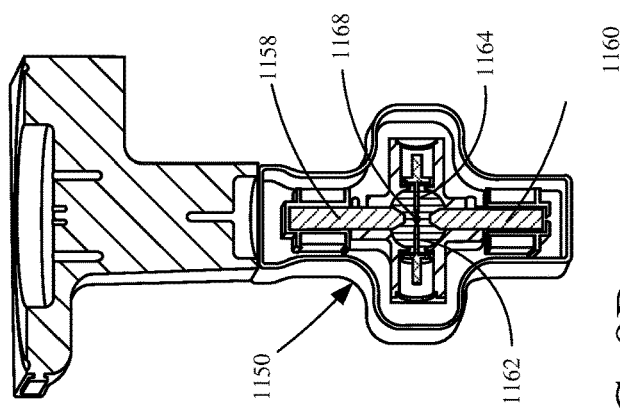
Figure 9A:
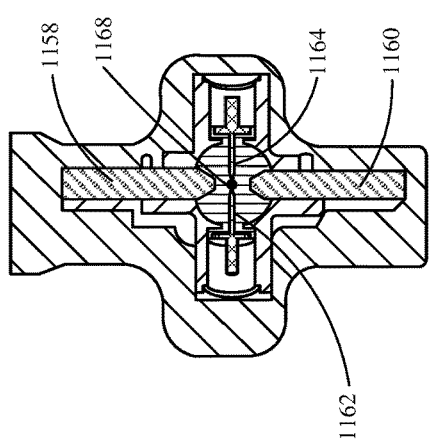

FIG. 9A illustrates an exemplary flow body assembly after a lining process. Flow body assembly 1150 includes a pair of coils 1158, 1160 and a pair of electrodes 1162, 1164, that may be substantially similar to those of flow body 150 described previously. As illustrated in FIG. 9A, flow body assembly 1150, after a lining process, contains only a pilot bore 1168 with a preset, manufactured diameter. The pilot bore 1168, in one embodiment, is designed to allow for later machining by a manufacturer or customer to a desired bore diameter.

FIG. 9B illustrates an exemplary flow body assembly 1150 after an assembly process, wherein flow body assembly 1150 still contains a pilot bore 1168. However, as illustrated in FIG. 9B, after the assembly process, flow body assembly 1150 is mounted within meter assembly 1100.

Once flow body assembly 1150 has been installed, the bore can be machined to any selected diameter required by a user or application. For example, as illustrated in FIG. 9C, machined bore 1172 has a larger diameter than initial pilot bore 1168. The diameter of machined bore 1172 can be selected by a customer and finally machined, in one embodiment, by the manufacturer prior to shipment. In another embodiment, the diameter of final machined bore 1172 is set by the customer and machining is completed by the customer.

Figure 9D:
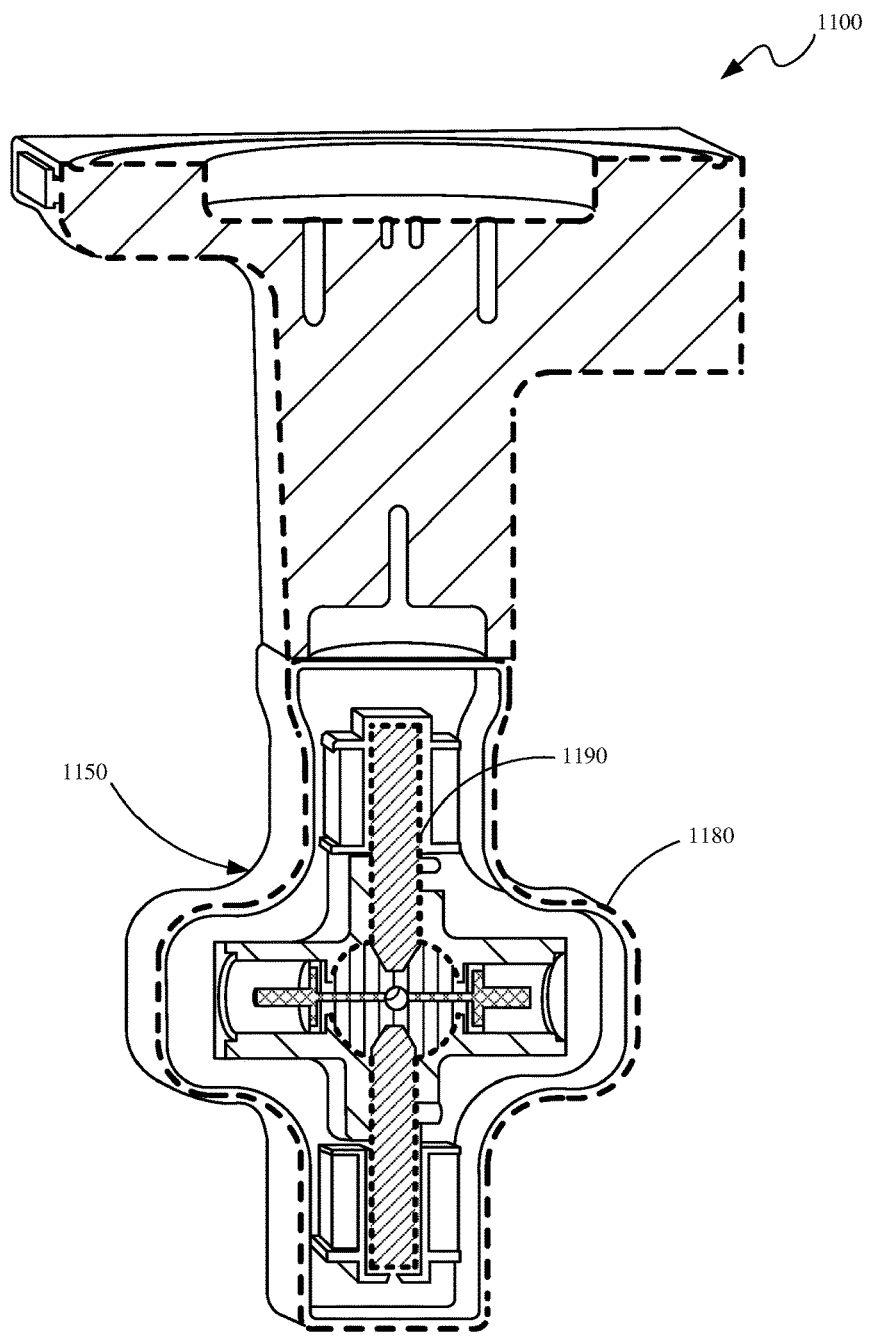

In at least one embodiment, a flow tube assembly, such as assembly 1150, needs to be compliant with one or more safety standards. In one embodiment, a flow body assembly may need to be compatible for use within a hazardous or explosive environment, for example due to the presence of hazardous and/or explosive process fluids. However, to provide a sufficient magnetic field to allow a magmeter to function, the coil circuitry cannot be energy-limited and therefore alternative separation must be used. Separation barriers, for example barriers 1180 and 1190, illustrated in FIG. 9D, can be used to maintain compliance with intrinsic safety standards in order for flow body assembly 1150 to be used within a hazardous or explosive atmosphere. In one embodiment, flow body assembly 1150 is compliant with international hazard standard FM3600. In another embodiment, flow body assembly 1150 is compliant with international hazardous standard IEC60079. In one embodiment, flow body assembly 1150 utilizes standard materials, for example steel and/or iron recognized by ASME B31 such that boundaries are established to contain line pressure. In one embodiment, boundary 1190 is maintained around portions of the flow body assemblies as illustrated in FIG. 9D such that a hazardous location separation and a boiler pressure vessel pressure boundary are maintained. In one embodiment, boundary 1180 is present around the flow body assembly such that a boiler pressure vessel pressure boundary is maintained within boundary 1180.

Figures 10A, 10B, 10C:
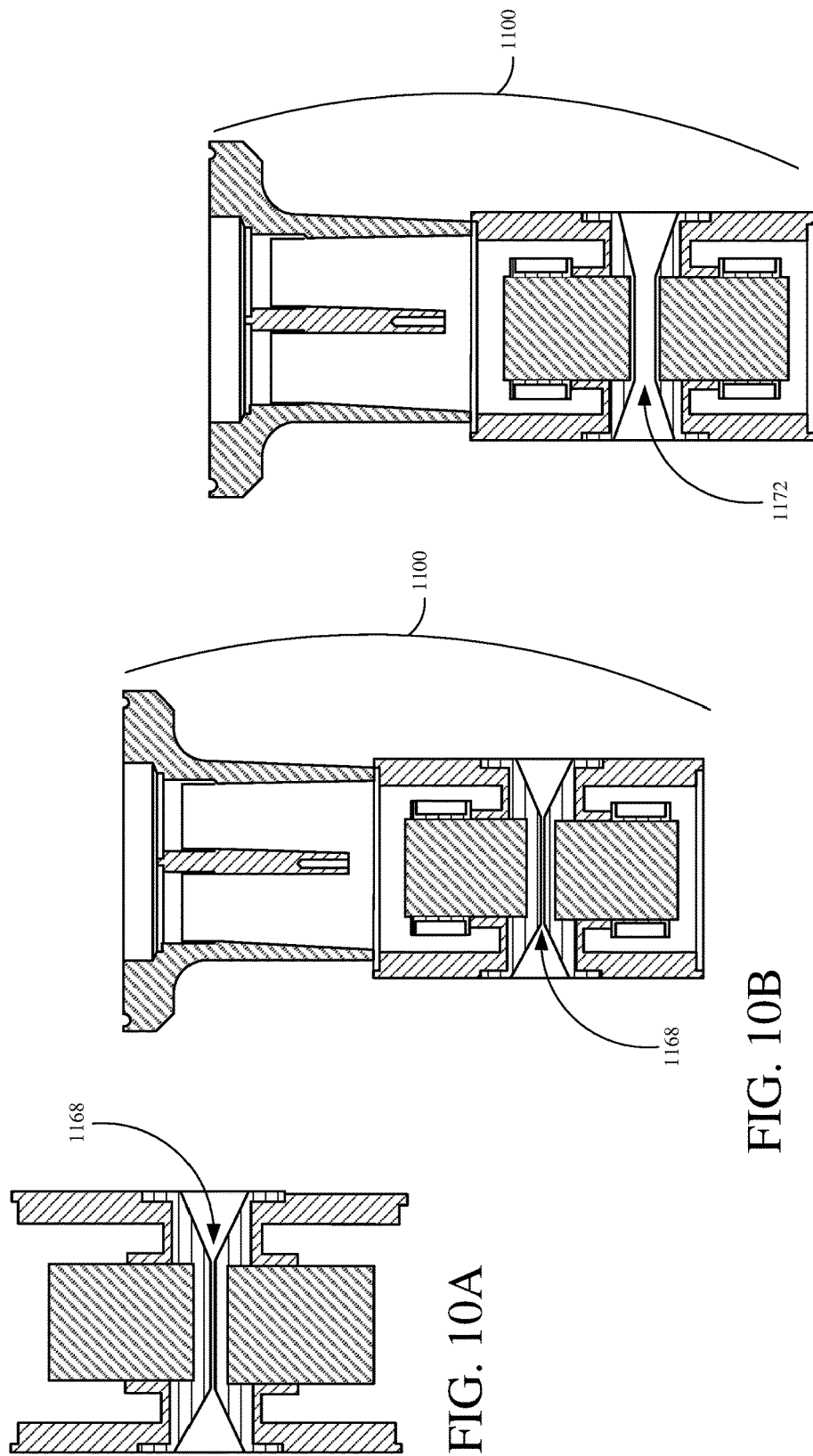
FIGS. 10A-10C illustrate diagrammatic views of a polymeric flow body assembly in different stages of a process installation in accordance with one embodiment of the present invention.

FIGS. 10A-10C illustrate diagrammatic views of a polymeric flow body assembly in different stages of manufacture in accordance with one embodiment of the present invention. FIG. 10A illustrates a view of flow body assembly 1150 after an initial lining process. FIG. 10B illustrates a view of the flow body assembly after an assembly process. In both FIGS. 10A and 10B the flow body assembly is illustrated with an initial pilot bore 1168. FIG. 10C illustrates a final flow body assembly with a machined bore 1172 having a diameter that is larger than initial pilot bore 1168. In one embodiment, the steps illustrated in FIGS. 10A-10C can be accomplished by the manufacturer after receiving a customer order, allowing for final bore machining and calibration to be completed by the manufacturer. However, a series of flow body assemblies with pre-manufactured pilot bores, as illustrated in FIG. 10B, can be stocked by a manufacturer and final machining and calibration can be completed, as illustrated in the transition from FIGS. 10B to 10C, as requested by the customer.

Figure 11:
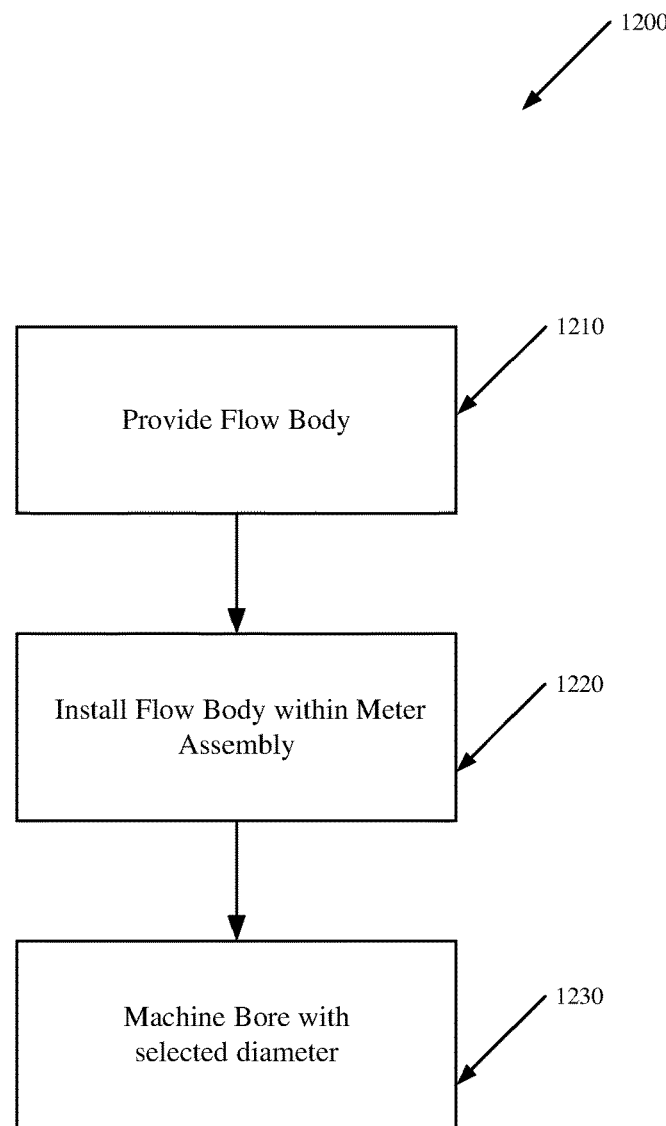
FIG. 11 is a flow diagram of a method of forming a flow body assembly during an installation within a process environment in accordance with one embodiment of the present invention.

FIG. 11 is a flow diagram of a method of forming a flow body assembly during an installation within a process environment in accordance with one embodiment of the present invention. Method 1200 provides a process such that either a manufacturer or a customer can machine a flow body assembly with a selected bore diameter.

In block 1210, a flow body is provided, for example within a manufacturing process. The flow body, for example could be flow body 1150 as described with regard to FIGS. 9 and 10, either before or after a lining process has been completed. Initially, the flow body could be provided with one or both of barriers 1180 and 1190 in place.

In block 1220, the provided flow body is installed within a meter assembly. This may be accomplished by a manufacturer installing the flow body within a meter assembly. In block 1220, a lining process may also be accomplished.

In block 1230, the provided flow body is machined to a desired bore diameter. In one embodiment, this involves enlarging an initially-provided pilot bore diameter. In one embodiment, this involves calibration of the final bore diameter. After the flow body assembly has a finally machined bore diameter, it may be installed within a process environment, or shipped to a customer for installation.

One advantage of providing a machinable flow body assembly, such as assembly 150 or 1150, is that it allows for the inside diameter of the liner and the electrodes to be machined or reamed to the same diameter in a single operation, performed after initial manufacturing of the flow body, such that the flow body assembly, within the final meter assembly, has a bore diameter selected by a customer. Additionally, a pre-manufactured, machinable flow body assembly allows for a variable bore geometry to be machined after critical manufacturing operations of the electrode assembly, coil assembly, wiring and welding have been completed by the manufacturer. Additionally, using materials compliant with any of the above described standards allows for a variable bore geometry to be machined such that a pressure boundary is not affected by the variable bore geometry when finally machined. Additionally, use of compliant materials allows for separation of hazardous process fluids and environments from rated circuitry independent of the variable bore geometry.

Another advantage of a flow body assembly, such as assembly 150 or 1150, available to be machined by an end user, is that it allows for the bore to be machined to alternate diameters in the field, allowing for elimination of a calibration shift, an otherwise required step. In at least one embodiment, flow body assembly 1150 eliminates the need for ground rings in a machinable multi-point process connection electrode.

Although the present invention has been described with reference to preferred embodiments, workers skilled in the art will recognize that changes may be made in form and detail without departing from the spirit and scope of the invention.

What is claimed is:

1. A polymeric flow body assembly comprising:
   a polymeric flow body having a measurement bore with a bore curvature;
   a first coil mounted with respect to the measurement bore and disposed about a first magnetic pole member disposed to contact fluid in the measurement bore;
   a second coil mounted with respect to the measurement bore and disposed about a second magnetic pole member that is also disposed to contact the fluid in the measurement bore, wherein the second magnetic pole member is configured to cooperate with the first magnetic pole member to generate an electromagnetic field across the measurement bore;
   first and second metal electrodes positioned within the flow body assembly to contact a fluid in the measurement bore and to measure an electromotive force generated within the fluid, wherein the first and second metal electrodes taper toward a center of the polymeric flow body assembly;
   wherein at least one of the first magnetic pole member and second magnetic pole member is formed, at least in part, of the polymer; and
   wherein each of the first and second metal electrodes and each of the first and second magnetic pole members has a curved end with the bore curvature.

2. The polymeric flow body assembly of claim 1, wherein each of the first and second magnetic pole members are formed of a magnetically compliant material embedded within a polymer.

3. The polymeric flow body assembly of claim 2, wherein the magnetically compliant material is iron.

4. The polymeric flow body assembly of claim 3, wherein the polymer is acrylonitrile butadiene styrene.

5. The polymeric flow body assembly of claim 1, wherein the first and second electrodes are formed of an electrically conducting material embedded within a polymer.

6. The polymeric flow body assembly of claim 5, wherein the electrically conducting material is selected from the group consisting of carbon and nickel.

7. The polymeric flow body assembly of claim 6, wherein the polymer is acrylonitrile butadiene styrene.

8. The polymeric flow body assembly of claim 1, wherein the first and second magnetic pole members are formed of the same polymer as the first and second electrodes.

9. The polymeric flow body assembly of claim 1, wherein at least one of the first and second magnetic pole members includes a sealing fin extending radially therefrom.

10. The polymeric flow body assembly of claim 1, wherein at least one of the first and second electrodes includes a sealing fin extending radially therefrom.

11. The polymeric flow body assembly of claim 1, wherein each of the first and second magnetic pole members includes a tapered end adjacent the measurement bore.

12. The polymeric flow body assembly of claim 1, wherein each of the first and second electrodes includes a tapered end adjacent the measurement bore.

13. The polymeric flow body assembly of claim 1, wherein each of the first and second electrodes is formed of stainless steel.

14. The polymeric flow body assembly of claim 1, further comprising a frame formed of the same polymer as the at least one of the first magnetic pole member, second magnetic pole member, first electrode and second electrode.

15. The polymeric flow body assembly of claim 1, and further comprising a magnetic return path formed of a magnetically compliant material embedded within a polymer.

16. A polymeric flow body assembly comprising:
- a polymeric flow body having a measurement bore with a bore curvature;
- a first coil mounted with respect to the measurement bore and disposed about a first magnetic pole member disposed to contact fluid within the measurement bore;
- a second coil mounted with respect to the measurement bore and disposed about a second magnetic pole member, wherein the second magnetic pole member is also disposed to contact the fluid within the measurement bore and is configured to cooperate with the first magnetic pole member to generate an electromagnetic field across the measurement bore;
- a first and second electrode, each comprising polymer and a conductive material, wherein the first and second electrodes are configured to detect the electromagnetic field across the measurement bore, wherein the first and second electrodes taper toward a center of the polymeric flow body assembly;
- wherein each of the first and second electrodes has a curved end with the bore curvature; and
- wherein each of the first and second magnetic pole members has a curved end with the bore curvature.

* * * * *

UNITED STATES PATENT AND TRADEMARK OFFICE
CERTIFICATE OF CORRECTION

| | |
|---|---|
| PATENT NO. | : 10,502,599 B2 |
| APPLICATION NO. | : 15/086826 |
| DATED | : December 10, 2019 |
| INVENTOR(S) | : Steven B. Rogers et al. |

It is certified that error appears in the above-identified patent and that said Letters Patent is hereby corrected as shown below:

On the Title Page

Page 2, Item (56) Foreign Patent Documents, Line 4, delete "22006249359" and insert --2006249359--

In the Claims

Column 8, Line 52, Claim 9, delete "tin" and insert --fin--

Signed and Sealed this
Eighth Day of November, 2022

Katherine Kelly Vidal
*Director of the United States Patent and Trademark Office*